United States Patent
Durant et al.

(10) Patent No.: US 9,791,324 B2
(45) Date of Patent: Oct. 17, 2017

(54) ELECTRONIC CALIBRATING THERMOMETER

(71) Applicant: DOREL JUVENILE GROUP, INC., Foxboro, MA (US)

(72) Inventors: Jason E Durant, Warwick, RI (US); Roger J Babineau, Taunton, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 716 days.

(21) Appl. No.: 14/216,569

(22) Filed: Mar. 17, 2014

(65) Prior Publication Data

US 2014/0269833 A1    Sep. 18, 2014

Related U.S. Application Data

(60) Provisional application No. 61/801,027, filed on Mar. 15, 2013.

(51) Int. Cl.
*G01K 7/00* (2006.01)
*G01K 1/02* (2006.01)
*G01K 1/20* (2006.01)
*G01K 13/00* (2006.01)

(52) U.S. Cl.
CPC ............... *G01K 1/028* (2013.01); *G01K 1/20* (2013.01); *G01K 13/002* (2013.01)

(58) Field of Classification Search
None
See application file for complete search history.

(56) References Cited

U.S. PATENT DOCUMENTS

| | | | | |
|---|---|---|---|---|
| 4,878,184 A * | 10/1989 | Okada | ...................... | G01K 7/42 374/107 |
| 5,441,476 A * | 8/1995 | Kitado | .................. | A61M 21/00 600/21 |
| 6,957,911 B2 | 10/2005 | Wong et al. | | |
| 8,608,178 B2 * | 12/2013 | Mori | ........................ | F02F 11/00 277/594 |
| 2012/0032797 A1 | 2/2012 | Babineau | | |
| 2012/0238901 A1 * | 9/2012 | Augustine | .............. | G01K 1/165 600/549 |

* cited by examiner

*Primary Examiner* — Lisa Caputo
*Assistant Examiner* — Nasir U Ahmed
(74) *Attorney, Agent, or Firm* — Barnes & Thornburg LLP

(57) ABSTRACT

A thermometer includes a temperature sensor, a controller configured to receive a signal from the temperature sensor, and an output configured to display a temperature determined by the controller from the signal.

20 Claims, 13 Drawing Sheets

US 9,791,324 B2

ELECTRONIC CALIBRATING THERMOMETER

PRIORITY CLAIM

This application claims priority under 35 U.S.C. §119(e) to U.S. Provisional Pat. App. No. 61/801,027, filed Mar. 15, 2013, which is expressly incorporated by referenced herein.

BACKGROUND

The present disclosure relates to a thermometer, and particularly to an electronic thermometer. More particularly, the present disclosure relates to an electronic thermometer which calibrates to the environment.

SUMMARY

According to the present disclosure, a thermometer includes a controller, a temperature sensor, and an output. The controller is configured to receive a temperature reading from the temperature sensor and provide the temperature reading to the output.

In illustrative embodiments, the controller is further configured to execute a timer having a limit value after the first temperature reading is received and disable, at least in part, operation of the thermometer until the limit value of the timer is reached or exceeded. As a result, the error in a subsequent temperature reading is minimized.

In illustrative embodiments, the controller is configured to execute a timer having a limit value after the first temperature reading is received and disable, at least in part, operation of the thermometer. The controller then receives a plurality of environment temperature measurements from the temperature sensor, processes the plurality of environment temperature measurements via the processor, and provides an error signal if the processing determines that one or more environment temperature measurements (i) reaches or exceeds an environment temperature limit or (ii) reaches or exceeds a rate of environment temperature change limit. As a result, the error in a subsequent temperature reading is minimized.

In illustrative embodiments, the controller is configured to disable, at least in part, operation of the thermometer after the first temperature reading is received. The controller then executes a calibration timer having a limit value after at least a part of the thermometer's operation is disabled, receive a plurality of environment temperature measurements from the temperature sensor after the limit value of the calibration timer has been reached, processes the plurality of environment temperature measurements via the processor and provide an error signal if the processing determines that one or more environment temperature measurements (i) reaches or exceeds an environment temperature limit or (ii) reaches or exceeds a rate of environment temperature change limit. As a result, the error in a subsequent temperature reading is minimized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view and perspective view of a thermometer in accordance with the present disclosure showing that the thermometer includes a temperature sensor adapted to take temperature readings of a patient and an environment surrounding the patient, a controller configured to execute processes as suggested in FIGS. 2 and 4-11B, and an output coupled to the controller to report patient temperature readings and signals providing the user with information regarding operation of the thermometer;

Figure 1:
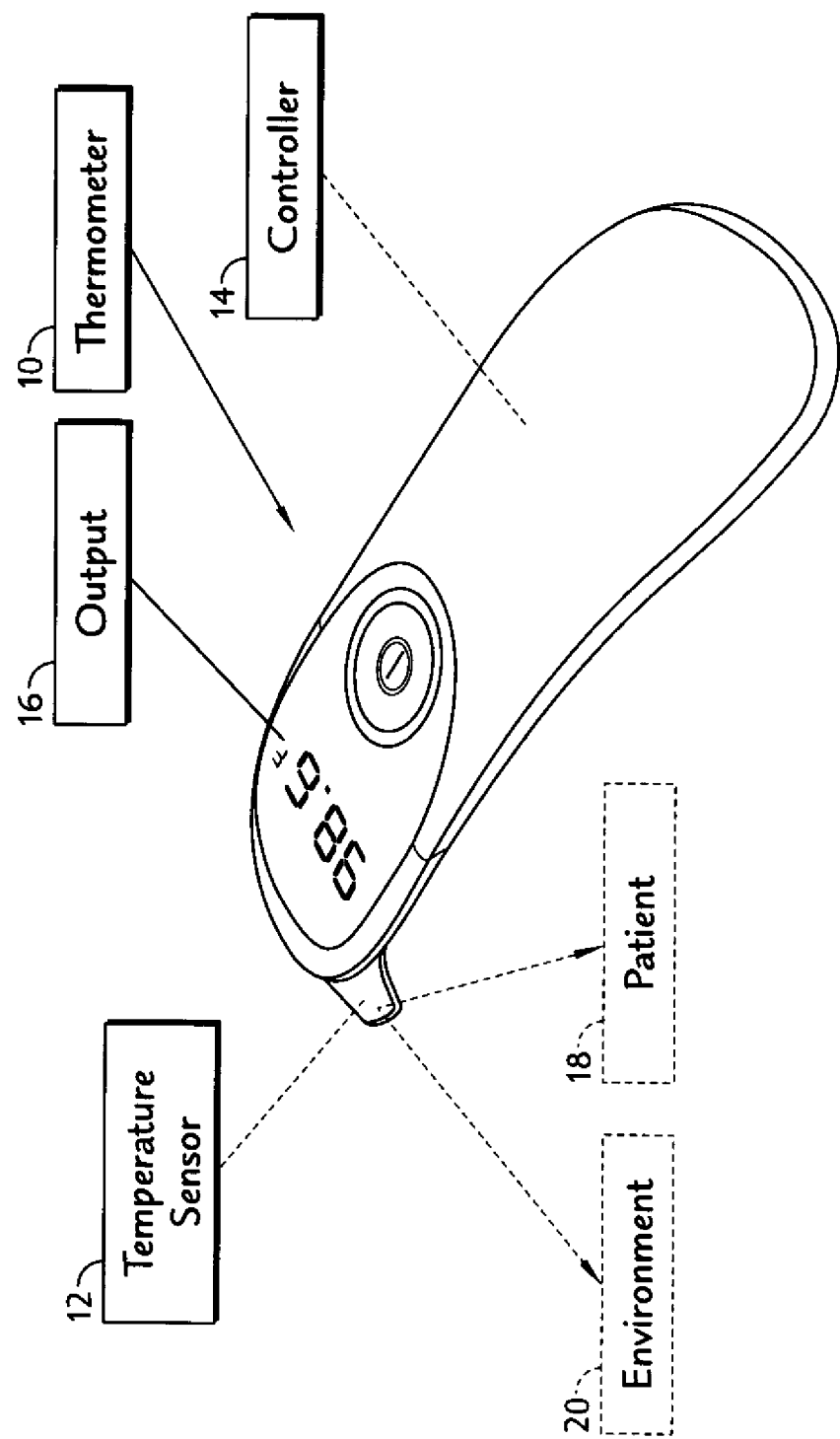
Figure 3A:
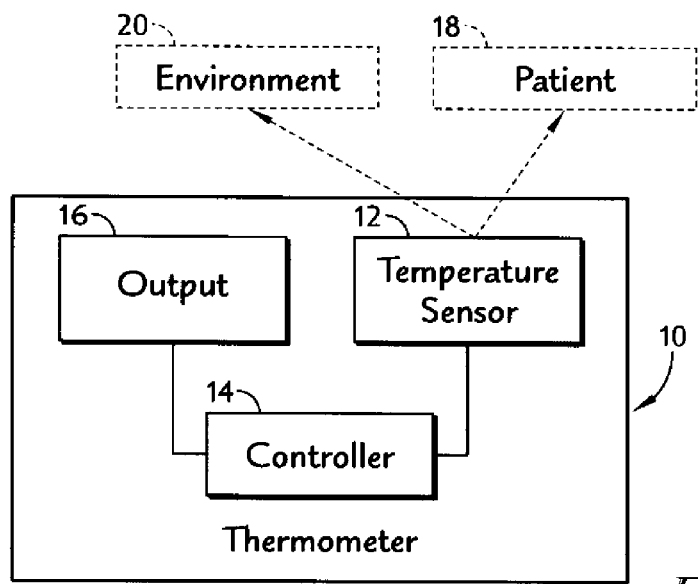
FIG. 3A is a diagrammatic view of the thermometer of FIG. 1 showing that the controller is coupled to the temperature sensor to take patient and environmental temperature readings for processing and providing one or more signals to an output.
Figure 3B:
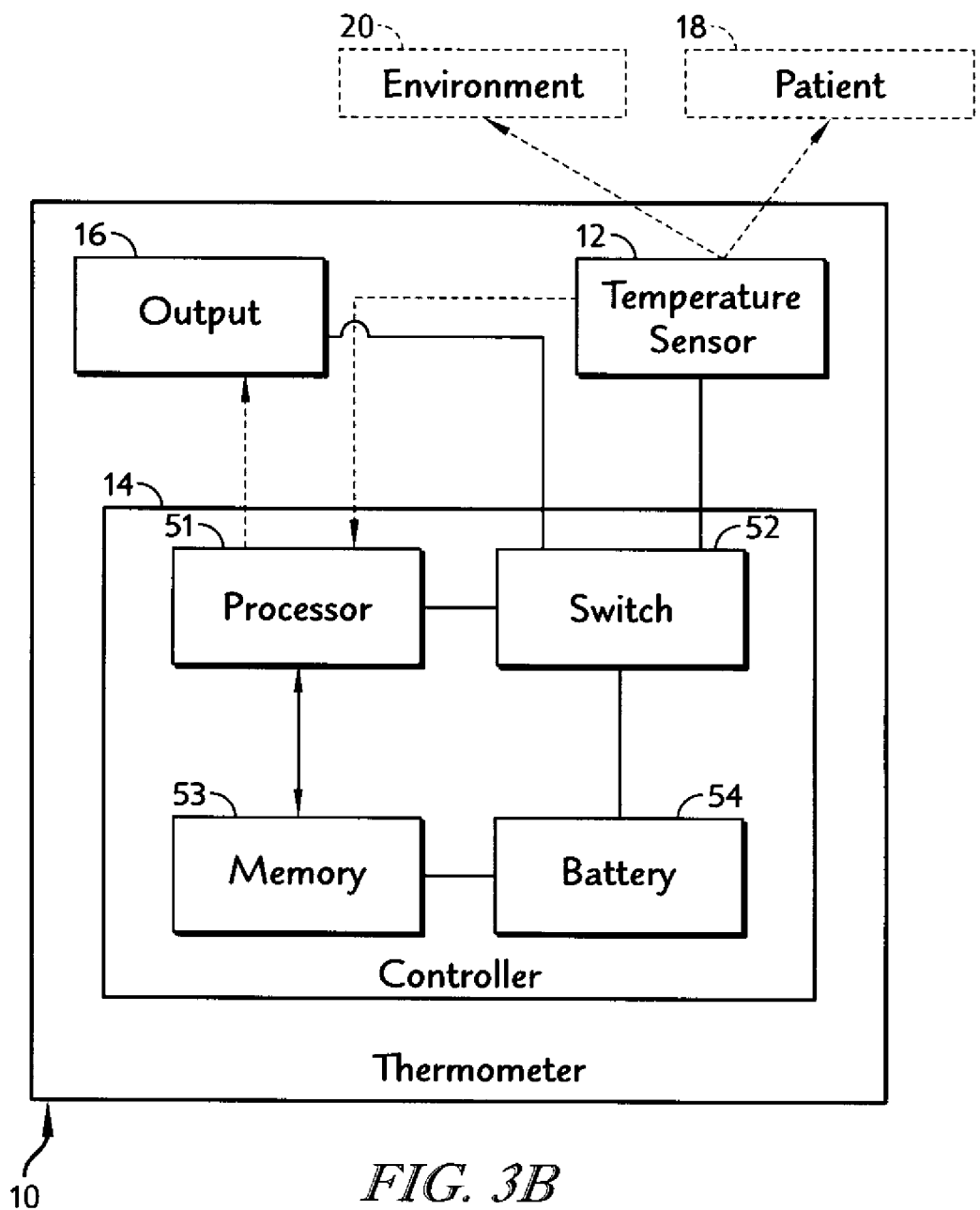
Figure 4:
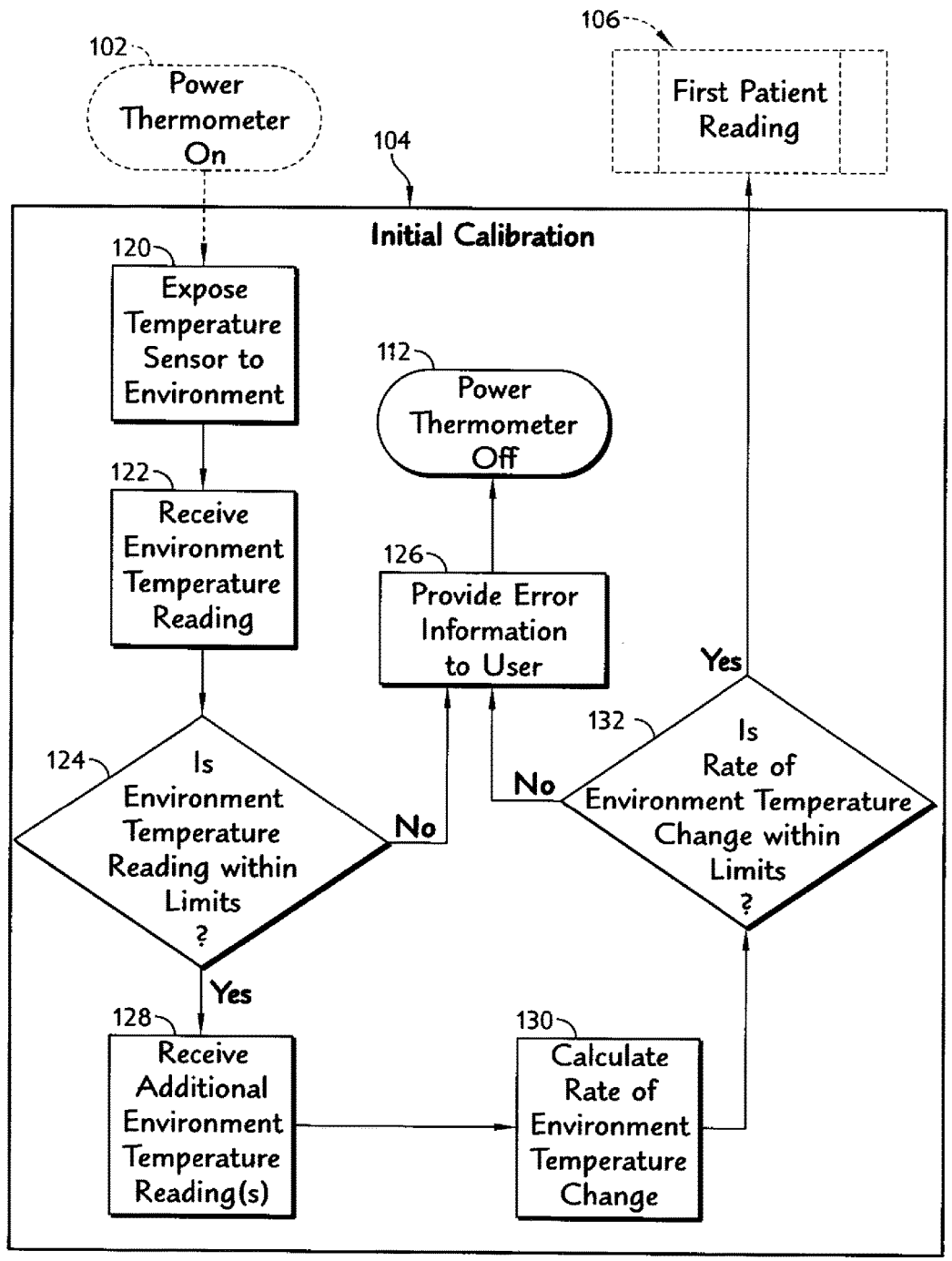
Figure 5:
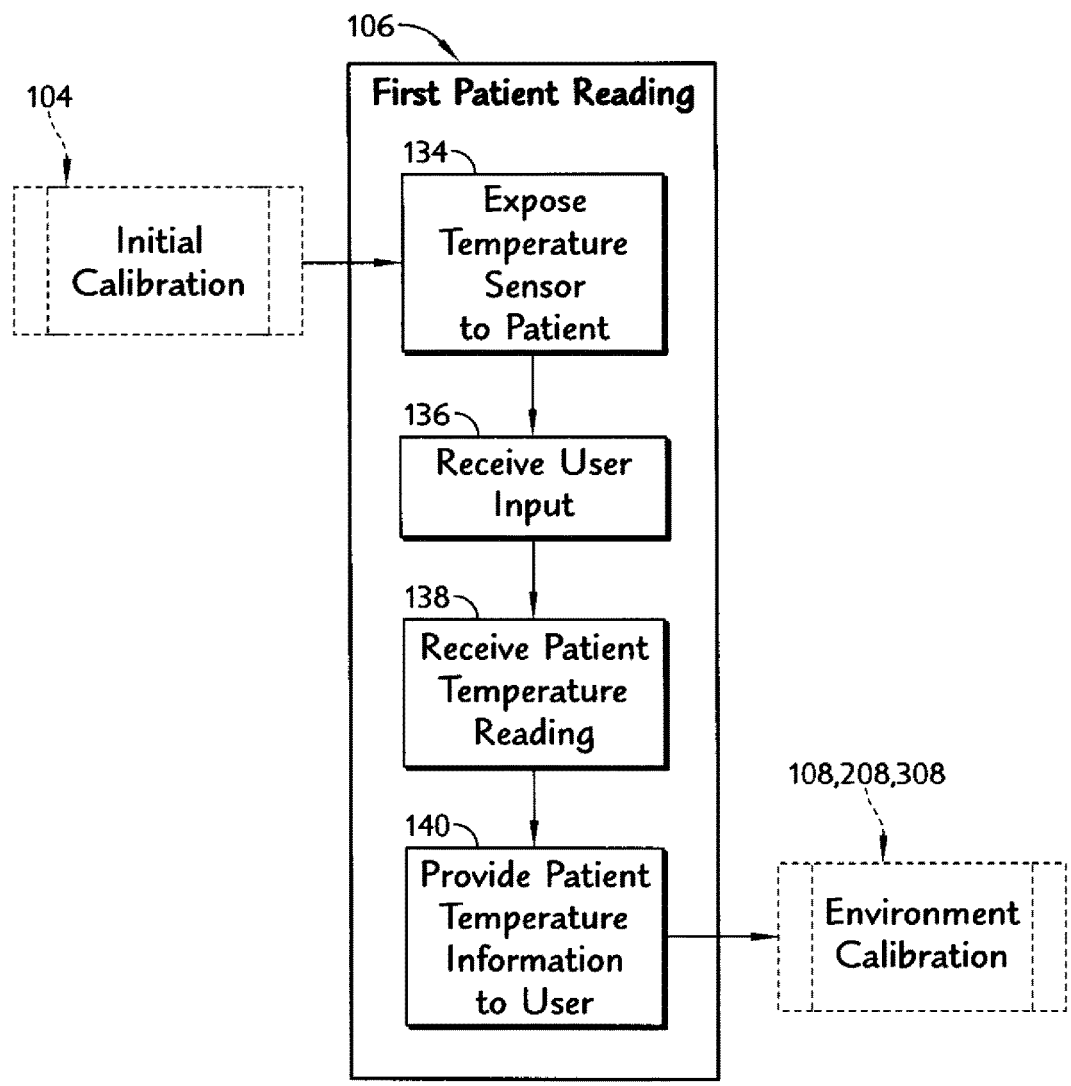
Figure 6:
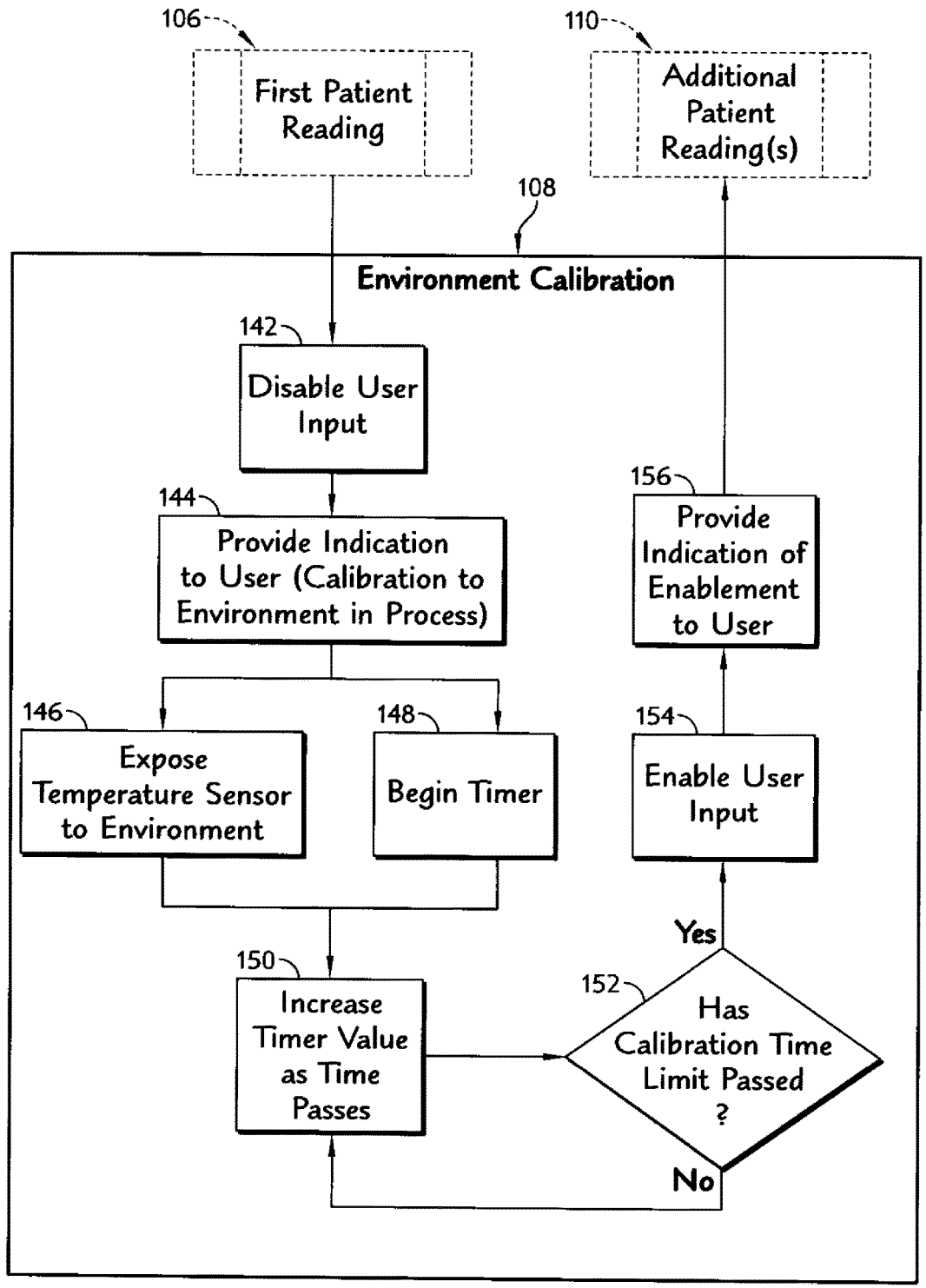
Figure 7:
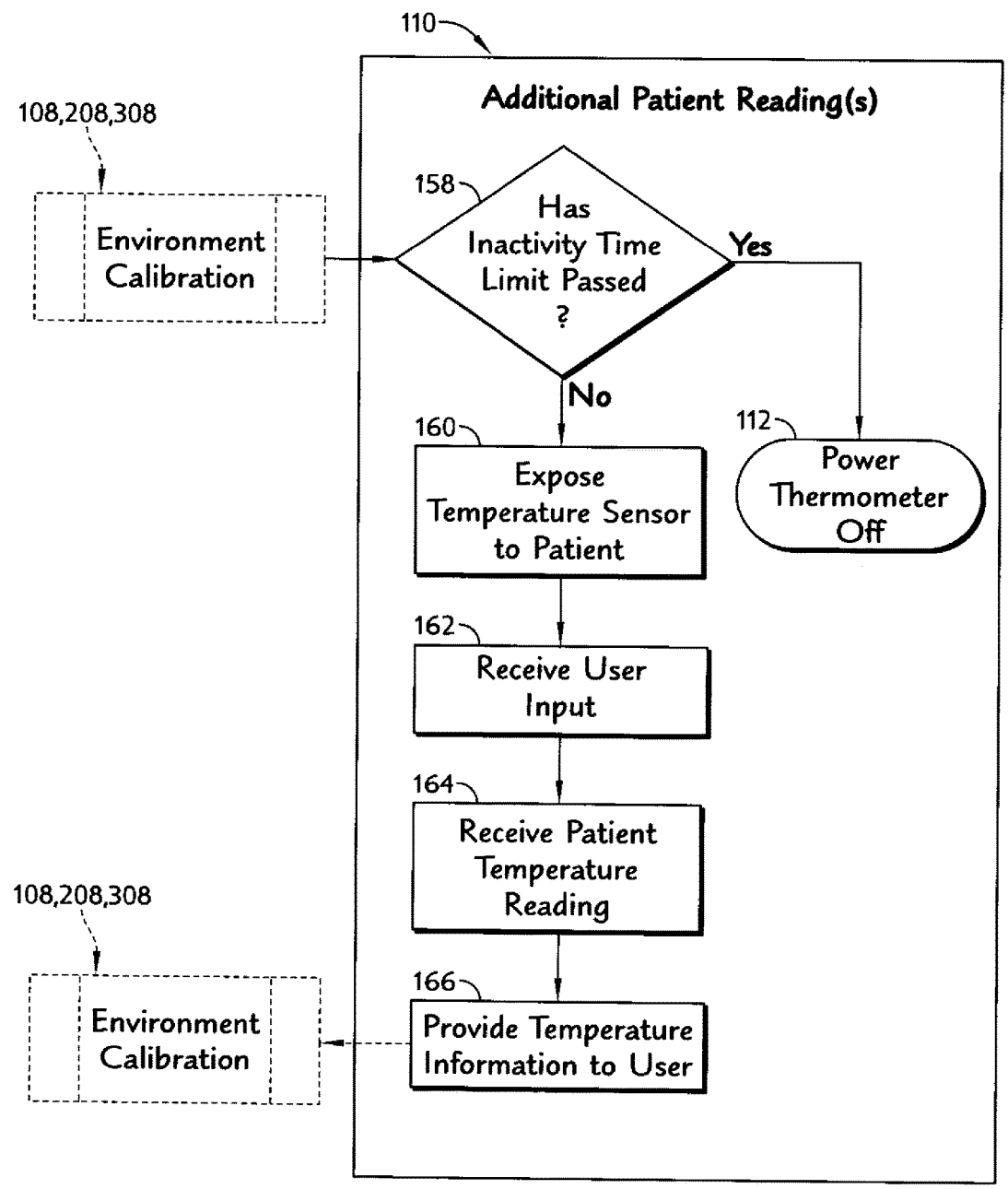
Figure 8:
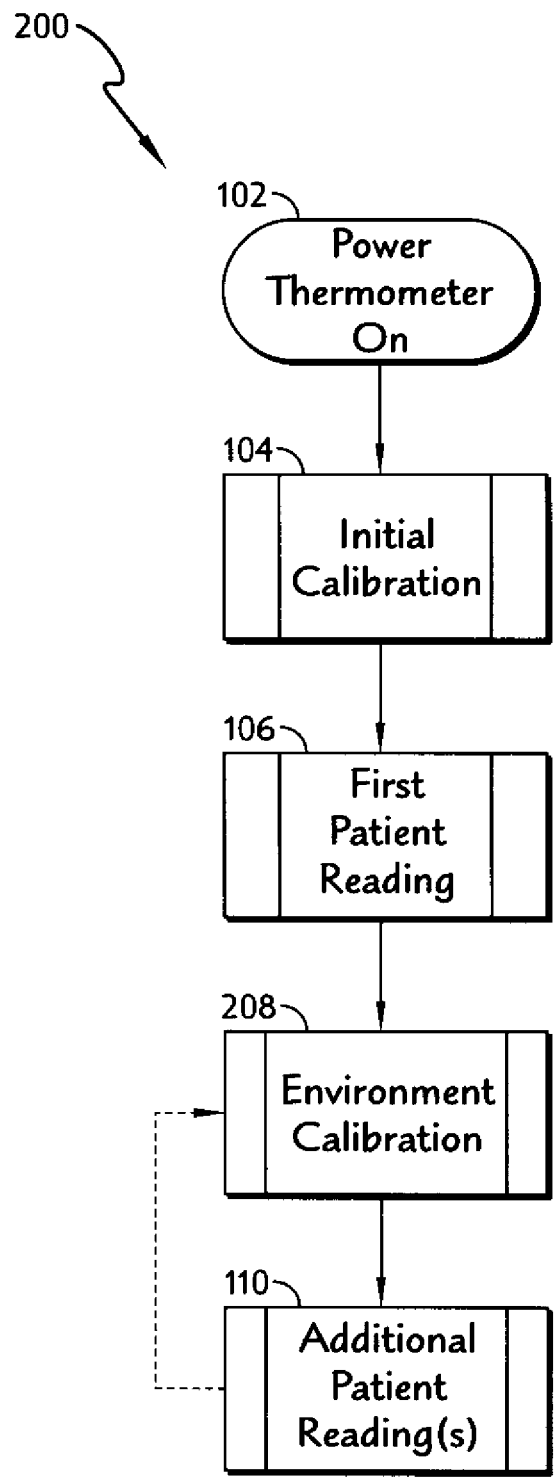
Figure 9A:
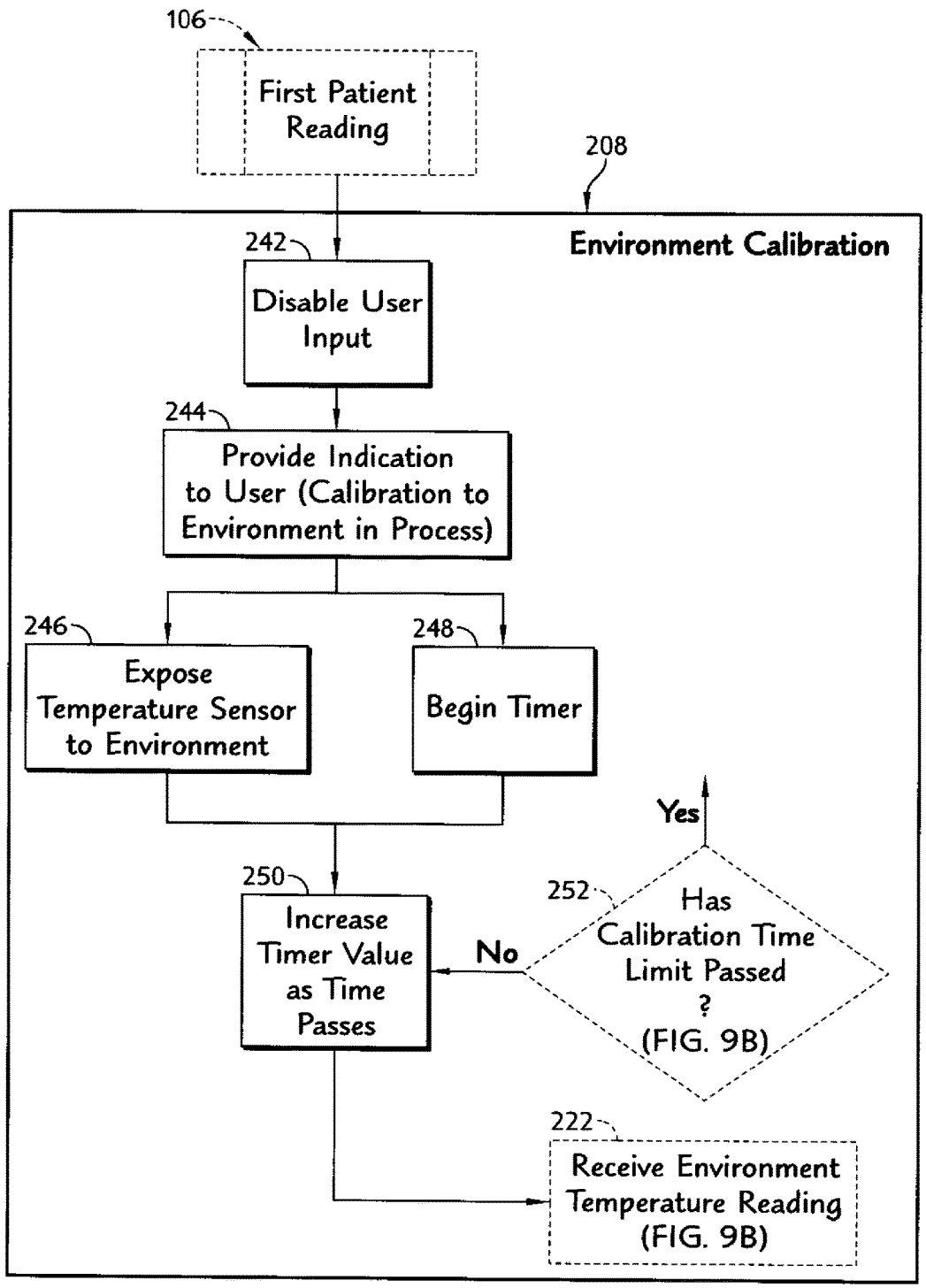
Figure 9B:
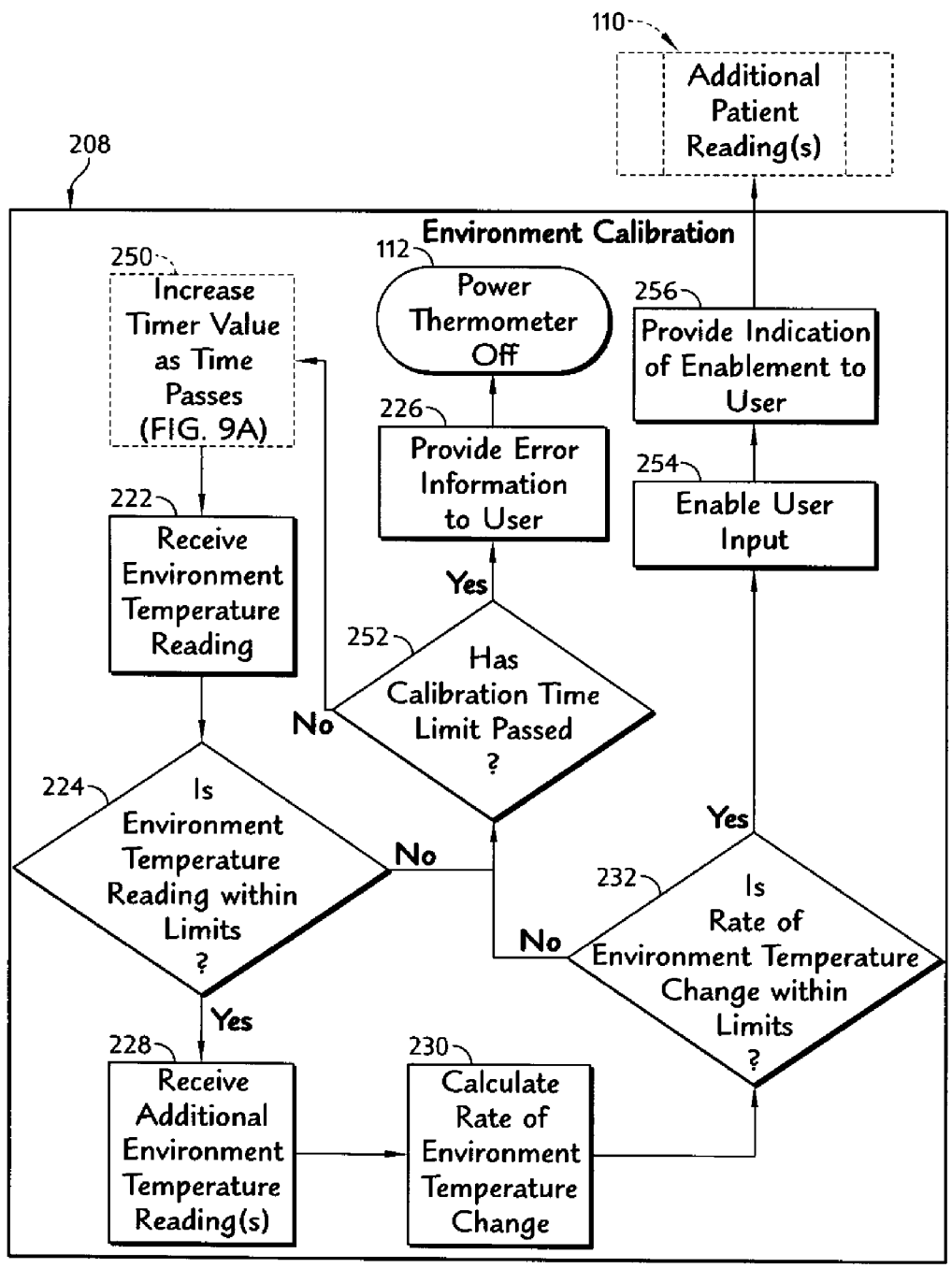
Figure 10:
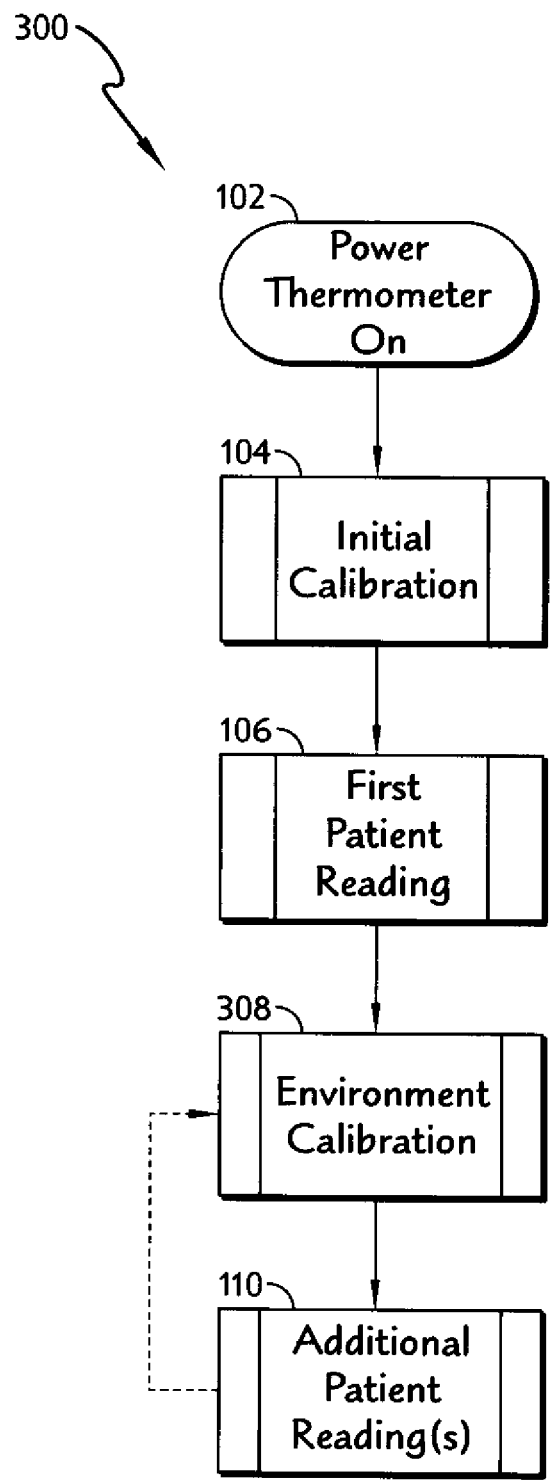
Figure 11A:
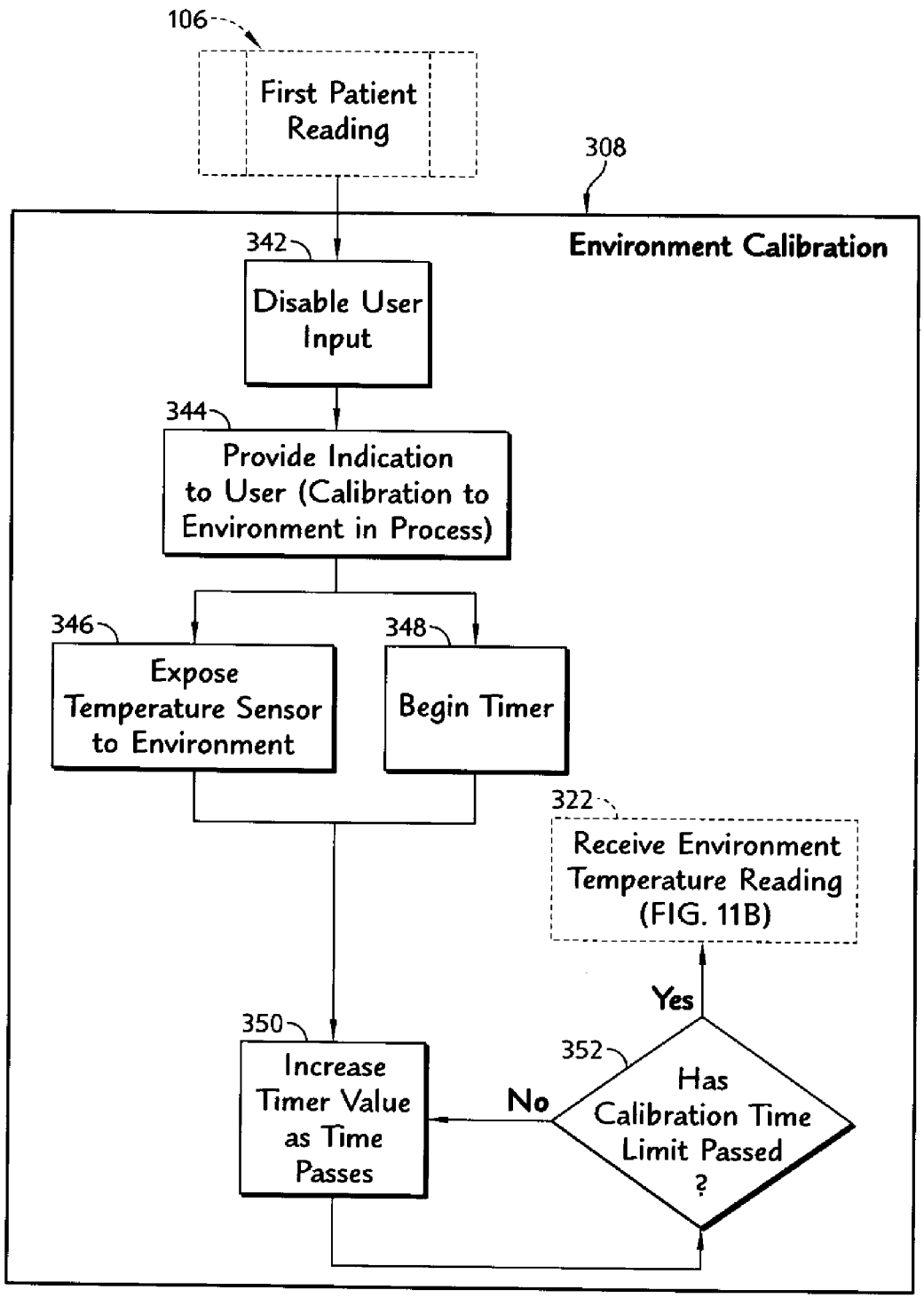
Figure 11B:
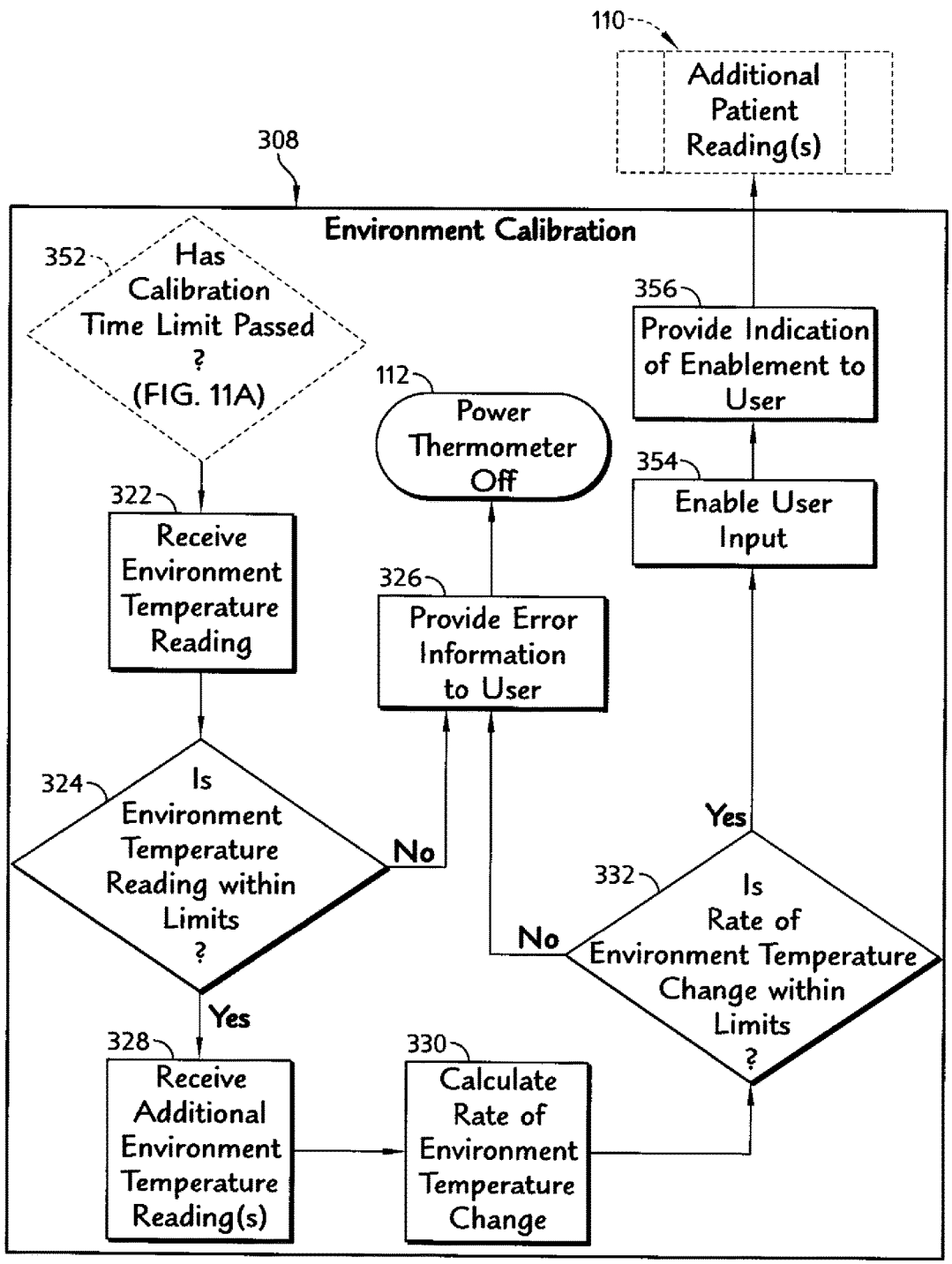

FIG. 3B is a diagrammatic view of the thermometer of FIGS. 1 and 3A showing that the thermometer includes a housing supporting various components included in the thermometer, the temperature sensor configured to obtain both patient and environment temperature readings, the controller including a battery, a switch coupled to the battery, the switch coupled to the processor control power from the battery, the temperature sensor to receive temperature readings, the output to communicate temperature readings and error signals, and memory coupled to the processor to provide information such as patient-temperature readings obtained from the temperature sensor, error signals, and instructions for the user;

FIG. 4 is a diagrammatic view of an initial calibration process where environmental temperature readings are processed to determine if the read values are within limits and are further processed to determine if a rate of environmental temperature change is within limits to allow a subsequent patient reading;

FIG. 5 is a diagrammatic view a first patient reading process showing that after an initial calibration, a patient temperature reading is obtained and provided to a user;

FIG. 6 is a diagrammatic view of a first embodiment of an environmental calibration process showing that after a first patient reading, an environmental calibration is performed in conjunction with a timer and a user input is enabled only after a calibration time limit has passed;

FIG. 7 is a diagrammatic view of an additional patient reading process showing that, after the first patient reading and the environmental calibration, an additional patient temperature reading is received, provided that an output from an inactivity time limit as not passed;

FIG. 8 is a diagrammatic view of a second embodiment of a process in which a thermometer performs an initial calibration prior to a first patient reading and performs a subsequent environmental calibration prior to subsequent patient readings;

FIG. 9A is a diagrammatic view of a portion of a second embodiment of an environmental calibration process for the process shown in FIG. 8 showing that after the first patient reading, user input is disabled and the temperature sensor is exposed to the environment for receiving environment temperature readings while simultaneously triggering a timer for setting a calibration time limit;

FIG. 9B is a diagrammatic view of a remaining portion of the second embodiment of FIG. 9A showing that the received environmental temperature readings are processed to determine if temperature readings and rate of environmental temperature change are within limits, subject to the calibration time limit;

FIG. 10 is a diagrammatic view of a third embodiment of a process in which a thermometer performs the initial calibration prior to the first patient reading and then performs a subsequent environmental calibration prior to subsequent patient readings;

FIG. 11A is a diagrammatic view of a first portion of a third embodiment of an environmental calibration process for the process shown in FIG. 10 showing that after the first patient reading, user input is disabled and the temperature sensor is exposed to the environment for receiving environment temperature readings subject to a calibration time limit; and FIG. 11B is a diagrammatic view of a remaining portion of the third embodiment of FIG. 11A showing that the received environmental temperature readings are processed to determine if temperature readings and rate of environmental temperature change are within limits, after the calibration time limit has passed.

DETAILED DESCRIPTION

A thermometer 10 is illustrated under one embodiment, where controller 14 (configured within the housing of thermometer 10 under one embodiment) comprises an output 16 and a temperature sensor 12 as shown illustratively in FIG. 1 and diagrammatically in FIGS. 3A and 3B. Output 16 comprises, for example, a display for displaying outputs and may further comprise an input button for turning on and/or activating readings for thermometer 10. Output 16 may comprise additional components, such as speakers for providing audible outputs/warnings, etc., and is not limited by the illustrated configuration.

Temperature sensor 12 is a sensor configured to acquire temperature readings in various locations on the body of a patient 18 which maintain a fairly stable temperature (e.g., oral/sub-lingual, axillary, rectal, vaginal, forehead, or temporal artery). The physical shape of temperature sensor 12 may be modified depending on the application used for thermometer 10. In addition to obtaining readings from patient 18, temperature sensor 12 also may be configured to obtain environment temperature readings 20. As used herein, environment or environmental temperature or temperature readings/measurements refer to an ambient temperature read or measured by temperature sensor 12.

Figure 2:
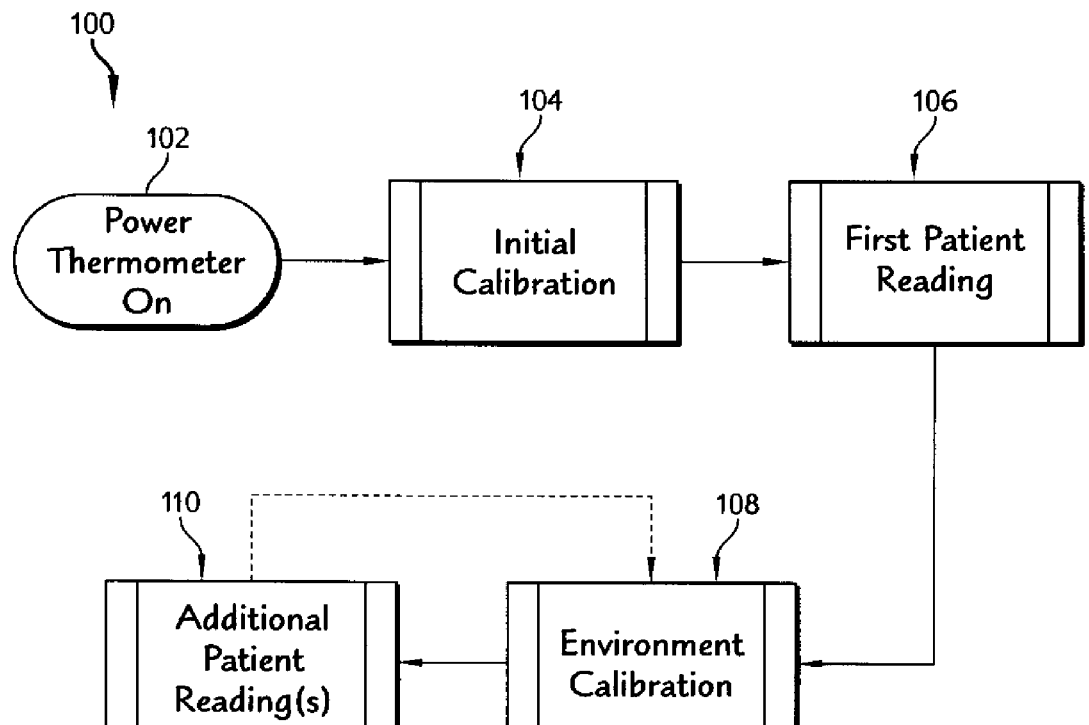
FIG. 2 is a diagrammatic view of a first embodiment of a process in which a thermometer performs an initial calibration prior to a first patient reading and performs a subsequent environmental calibration prior to subsequent patient readings.

A first embodiment of a process 100 for temperature measurement and calibration for a thermometer is shown in FIG. 2. Initially, a user powers a thermometer on in 102, which may initialize an initial calibration process 104, where environment temperature and rate of temperature change is processed prior to a first patient reading. Further details regarding the initial calibration may be found in FIG. 4 and supporting text below. After initial calibration 104, a first patient reading 106 is obtained and stored. Additional details regarding first patient reading 106 may be found in FIG. 5 and supporting text. After first patient reading 106 is obtained, environment calibration 108 is performed to determine if environmental conditions are within specified boundaries. Further details regarding patient reading 108 may be found in FIG. 6 and related text. Once environment calibration 108 is successfully completed, additional patient reading(s) 110 may be obtained. Further details regarding additional patient readings 110 may be found in FIG. 7 and supporting text. After each additional patient reading 110 is obtained, the process of FIG. 2 reverts back to environmental calibration 108 to determine if environmental conditions are within specified boundaries. If environmental calibration 108 is completed successfully, a next additional patient reading 110 may be obtained. The illustrative process may loop further to accommodate still further additional patient readings as necessary.

A block diagram of thermometer 10 of FIG. 1 is shown in FIG. 3A. A controller 50 is shown for receiving and processing environment 20 and/or patient 18 readings obtained by temperature sensor 12 and for providing a suitable signal to output 16 for display/presentation to the user.

Controller 50, which comprises a processor 51, a switch 52, a memory 53 and a battery 54 is shown in FIG. 3B. Processor 51 is, for example, configured as a central processor (CPU), or may comprise multiple processors, memory/bus controllers, and digital signal processors. Processor 51 is coupled to memory 53, which may comprise high-speed random access memory (RAM) and may also include non-volatile memory, such as one or more disk storage devices, flash memory devices, or other non-volatile solid-state memory devices. Access to memory 53, may be controlled by a memory controller integrated into processor 51, or embodied as a separate device. In one embodiment, processor 51 fetches, decodes, and executes instructions from a computer readable storage medium such as memory 53. Such instructions can be included in tangibly-embodied software such as an operating system (OS), executable programs, and the like. Information, such as computer instructions and other computer readable data, is transferred between components of controller 50 via a data-transfer path such as a system bus architecture, although other computer architectures may be used. The system bus can include data lines for sending data, address lines for sending addresses, and control lines for sending interrupts and for operating the system bus. Some busses may provide bus arbitration that regulates access to the bus by controllers and/or processor 51.

Power may be provided by battery 54, which passes through switch 52. Switch 52 may be a manually-controlled switch and/or a programmable switch, which is at least partially controllable by processor 61. Switch 52 may be embodied as a button on output 16 as shown in FIG. 1. Battery 54 may further provide power to memory 53.

An initial calibration process 104 is shown, for example, in FIG. 4. Prior to a first use, power for thermometer 10 is turned on 102, whereupon temperature sensor 12 is exposed to the environment (e.g., ambient air) and begins to receive one or more environment temperature readings 122. Processor 51 processes the environment temperature readings and makes a determination whether or not the environment temperature reading(s) are within specified limits. Here, predetermined temperature threshold limits may be stored in memory 53 and called by processor 51 and a comparison is made. As an example, temperature threshold limits may be set as 50° F. minimum and 80° F. maximum, which approximates an ambient temperature of an average household. Variations of temperature threshold limits may be configured in thermometer 10 depending on the thermometric application being used. Multiple (e.g., three or more) thresholds may be set such that different messages and/or warnings may be provided, depending on the measured environment temperature.

If one or more of the initial environment temperature limits are not within limits and are being exceeded (No), thermometer 10 provides error information to a user 126, via output 16, and powers thermometer 10 off 112. However, if the initial environment temperature is within the limit(s)

(Yes), temperature sensor 12 takes additional environment temperature readings 128 and processor 51 calculates a rate of environment temperature change 130, where multiple temperature readings are taken and stored in memory 53. In one embodiment, the rate of environment temperature change is determined by a change in temperature over a given time period, which may range from milliseconds to tens of seconds. Processor 51 then processes the temperature readings to determine if the rate of environment temperature change is within limits 132. If the rate is not within limits (No), an error message is provided to user 126 via output 16 and thermometer 10 is powered off. If the rate of environmental temperature change is within the prescribed limits (Yes), the thermometer is calibrated for a first patient reading 106 as shown in FIG. 4.

After initial calibration 104, a first patient reading 106 is taken, where, in step 134, the thermometer 10 is placed in or near the patient to expose the temperature sensor 12 to the patient as shown in FIG. 5. A user input is then received 136 to read the temperature. In some examples, steps 134 and 136 may be interchanged. After receiving patient temperature reading 138, processor 51 processes the temperature data to provide patient temperature information to user 140 via output 16. After first patient reading 106 is completed, a subsequent environmental calibration is performed as suggested in FIG. 6.

A first embodiment of an environmental calibration 108 is shown in FIG. 6. Here, after first patient reading 106 is completed, user input is disabled 142 to disallow immediate re-measurement of a patient's temperature. In this embodiment, output 16 may issue a message to a user to provide indication that an environment calibration is in process (e.g., Please wait. Thermometer is calibrating.). Here, a time-based calibration occurs by triggering a timer 148 as temperature sensor 12 is exposed to the environment 146. The timer may be set for any appropriate time period for lowering the temperature of temperature sensor 12 to provide a more stable platform for performing additional readings.

Processor 51 increases the time value as time passes in 150 and a determination is made in processor 51 if the calibration time limit has passed 152. If it has not (No), processor 51 further increases the timer value, and determines again in 152 if the calibration time limit has passed. This process may repeat until processor 51 determined that the time limit has passed (Yes), whereupon user input is enabled 154, and an indication is provided (via output 16) that thermometer 10 is enabled for use. At this point, an additional patient reading may be obtained 110. The timer of FIG. 6 may be configured in different ways, and may be an incremental timer (count-up) or a decremental timer (count-down). In the case of a decremental timer, processor 51 would decrease the timer in step 150 until a calibration time limit has passed.

The calibration of FIG. 6 (as well as FIGS. 9A-B and 11A-B, discussed below) has the effect of minimizing errors/distortions associated with taking patient temperature readings in rapid succession. As an example, caregivers will often take a first patient temperature and immediately take a second patient temperature to verify the first patient temperature. However, error is introduced as temperature sensor 12 is still affected by the first patient temperature reading. Temperature sensor 12 should be allowed to cool off and recalibrate to environment 20 before another reading can take place. As a result, the calibration disclosed herein provides users with feedback that may modify user behavior to wait until recalibration has occurred so that error is minimized.

The calibration of FIG. 6 (as well as FIGS. 9A-B and 11A-B, discussed below) has another effect for minimizing temperature distortions for thermometers that may be in undesirable environments prior to a first reading from a patient or object (if thermometer is being utilized for an industrial or other non-medical purposes). For example, a thermometer may be in an enclosure, whose interior excessively heats (summer) or cools (winter) the thermometer and temperature sensor. If the thermometer is retrieved from the enclosure just prior to taking an initial measurement, the excessive heat/cold could distort this measurement. Additionally, even if a short period of time passes after the thermometer is brought out, the temperature of the thermometer may not have stabilized (i.e., going from hot-to-cold, or cold-to-hot), which would provide a suboptimal basis for taking an initial temperature. By waiting until the thermometer temperature is at an appropriate range and has stabilized (i.e., the rate of temperature change has minimized to an acceptable level), more accurate readings may be effected.

Once environmental calibration 108 is completed, additional patient reading(s) 110 may be obtained. As shown in FIG. 7, a determination is made by processor 51 whether or not an inactivity time limit has passed 158. The inactivity timer may be configured similarly to the timing process 148, 150, 152 shown in FIG. 6. If the inactivity time limit has passed (Yes), this is an indication that the user has no intention of taking further readings. As such, processor 51 powers thermometer to an off state in 112. However, if the inactivity timer has not passed the limit (No), the temperature sensor 12 is exposed to the patient 160 and a user input is received 162 for initiating measurement. In another example, the order of temperature sensor exposure and user input may be reversed. After patient temperature readings are received in 164, processor 51 processes the temperature signals and provides temperature information to user 166 via output 16. Prior to still further additional patient readings, an environmental calibration 108 is performed to maximize accuracy.

A second embodiment of a process 200 for temperature measurement and calibration of a thermometer is illustrated under an exemplary embodiment is shown in FIG. 8. Thermometer 10 is powered on and an initial calibration 104 is performed prior to a first patient reading 106. After the first patient reading, a second embodiment of an environmental calibration 208 is performed prior to additional patient reading(s) 110.

Another embodiment of an environment calibration process 208 is shown, for example, in FIGS. 9A and 9B. Environment calibration process 208 is performed after a first patient reading 106 is obtained. After first patient reading 106 is obtained, user input 242 is disabled to disallow further temperature readings immediately after first patient reading 106 as shown in FIG. 9A. Concurrent with, or subsequent to, disablement, thermometer 10 provides an indication to a user that environment calibration is in process 244 via output 16. Next a timer is triggered to begin 248 as temperature sensor 12 is exposed to the environment 246. In one embodiment, the passing of time in 250 serves as a time-out function while environment temperature reading is performed in 222.

As time value is increased (or decreased, as the case may be), environment temperature reading is received in 222, whereupon processor 51 determines if the received temperature signals are reading within limits 224 as shown in FIG. 9B. If temperature readings are exceeding one or more thresholds (No), processor 51 determines if a calibration time limit has passed 252. The calibration time limit of 252 may be configured in a similar manner as calibration time limit 152 in the embodiment of FIG. 6. If the calibration time limit has not passed (No), the timer value in 250 is increased and the process proceeds to steps 222-224, discussed above. If the calibration time limit has passed (Yes), a message and/or error information is provided to user 226 via output 16 and the thermometer is powered to an off state 112.

If, in step 224, it is determined that environment temperature is reading within limits (Yes), additional environmental temperature readings are obtained 228, where processor 51 then calculates a rate of environment temperature change 230, similar to 130 in the embodiment of FIG. 4. If processor 51 determines that a rate of environment temperature change is not within limits (No), meaning that the temperature is rising or falling too quickly, a determination is made in 252 if the calibration time limit has passed. If the calibration time has expired/passed (Yes), the process continues to steps 226 and 112 to provide an error message and power off the thermometer. If the rate of environment temperature change is within limits (Yes), processor 51 enables user input 254 and provides an indication of enablement to the user 256 via output 16, at which time additional patient readings may be performed 110.

The embodiments of FIGS. 9A-B have the effect of re-calibrating thermometer 10 after a first patient reading by both determining compliance with temperature and temperature change limits. Such calibration may be useful in instances where a thermometer may be resting or in contact with the body of a feverish patient, or a hot water bottle, any of which could unacceptably affect subsequent temperature readings. Similarly, if thermometer 10 is placed in an unacceptably hot or cold environment (e.g., hot water bottle, ice pack, etc.), the sudden temperature rate change could similarly affect subsequent temperature readings. Even if a user realizes that a thermometer is resting on an inappropriately hot or cold surface and withdraws the thermometer from it, the temperature rate change compliance feature would minimize the chance of taking a (subsequently skewed) temperature measurement without first calibrating the thermometer to a more stable temperature environment. Furthermore, the timer and calibration time features provided error feedback and shutdown when it is determined that a thermometer is either no longer being used, or is being used in an environment having unacceptable temperature characteristics.

Another embodiment of a process 300 for temperature measurement and calibration for a thermometer is illustrated under an exemplary embodiment as shown in FIG. 10. Thermometer 10 is powered on, and initial calibration 104 is performed prior to first patient reading 106. After the first patient reading, environmental calibration 308 of is performed prior to additional patient reading(s) 110.

Another embodiment of an environment calibration process 308 is shown, for example, in FIGS. 11A and 11B. Environment calibration process 308 is performed after a first patient reading 106 is obtained. User input 342 is disabled to disallow further temperature readings immediately after first patient reading 106 as shown in FIG. 11A. Concurrent with, or subsequent to, disablement, thermometer 10 provides an indication to a user that environment calibration is in process 344 via output 16. Next a timer is triggered to begin 348 as temperature sensor 12 is exposed to the environment 346. In one embodiment, the time value and passing of time in 350 is tied to a calibration time where, if it is determined that a calibration time limit has not passed (No), the time value is increased 350 (or decreased, as the case may be) until the calibration time expires (Yes), in which case the process begins receiving environment temperature reading 322 as shown in FIG. 11B.

After calibration time period has passed 352, environment temperature reading is received in 322, whereupon processor 51 determines if the received temperature signals are reading within limits 324 as shown in FIG. 11B. If temperature readings are exceeding one or more thresholds (No), a message and/or error information is provided to user 326 via output 16 and the thermometer is powered to an off state 112. If, in step 324, it is determined that environment temperature is reading within limits (Yes), additional environmental temperature readings are obtained 328, where processor 51 then calculates a rate of environment temperature change 330, similar to 130 in the embodiment of FIG. 4. If processor 51 determines that a rate of environment temperature change is not within limits (No), meaning that the temperature is rising or falling too quickly, a message and/or error information is provided to user 326 via output 16 and the thermometer is powered to an off state 112. If the rate of environment temperature change 332 is within limits (Yes), processor 51 enables user input 354 and provides an indication of enablement to the user 356 via output 16, at which time additional patient readings may be performed 110.

The embodiments of FIGS. 11A-B have similar effect as those described above in FIGS. 9A-B. However, in the embodiments of FIG. 11A-B, the environment calibration is taken after a calibration timer has expired, resulting in a complete temperature and temperature rate calibration before additional patient readings are taken.

The invention claimed is:

1. A thermometer comprising
   a controller and
   a temperature sensor coupled to the controller,
   wherein the temperature sensor is configured to receive a first temperature reading and the controller is configured to execute a timer having a limit value after the first temperature reading is received and disable user input to disallow re-measurement of a patient's temperature with the thermometer until the limit value of the timer is reached or exceeded.

2. The thermometer of claim 1, further comprising an output coupled to the controller to display the first temperature reading.

3. The thermometer according to claim 2, wherein the controller is configured to provide a message to the output for display until the limit value of the timer is reached or exceeded.

4. The thermometer of claim 2, wherein the controller is further configured to process a second temperature reading from the temperature sensor after the limit value of the timer is reached or exceeded and transmit the second temperature reading to the output for display.

5. The thermometer of claim 1, wherein the controller is further configured to enable, at least in part, operation of the thermometer and to process a second temperature reading from the temperature sensor after the limit value of the timer is reached or exceeded.

6. The thermometer of claim 1, wherein, prior to receiving the first temperature reading, the controller is configured to receive one or more environment temperature measurements from the temperature sensor.

7. The thermometer of claim 6, further comprising an output coupled to the controller and the controller is configured to process the one or more environment temperature measurements and provide an error message to the output when the controller determines that at least one of the one or more environment temperature measurements meet or exceed an environment temperature threshold.

8. The thermometer of claim 6, further comprising an output coupled to the controller and the controller is configured to process the one or more environment temperature measurements and provide an error message to the output when the controller determines that at least two of the environment temperature measurements meet or exceed an environment temperature change rate threshold.

9. The thermometer of claim 1, wherein, after receiving the first temperature reading, the controller is configured to receive one or more environment temperature measurements from the temperature sensor.

10. The thermometer of claim 9, further comprising an output coupled to the controller and the controller is configured to process the one or more environment temperature measurements and provide an error message to the output when the controller determines that at least one of the one or more environment temperature measurements meet or exceed an environment temperature threshold.

11. The thermometer of claim 9, further comprising an output coupled to the controller and the controller is configured to process the one or more environment temperature measurements and provide an error message to the output when the controller determines that at least two of the environment temperature measurements meet or exceed an environment temperature change rate threshold.

12. A thermometer comprising
a controller including a processor and
a temperature sensor coupled to the controller and configured to receive a first temperature reading,
wherein the controller is configured to
execute a timer having a limit value after the first temperature reading is received,
disable user input to disallow re-measurement of a patient's temperature with the thermometer,
receive a plurality of environment temperature measurements from the temperature sensor,
process the plurality of environment temperature measurements via the processor, and
provide an error signal when the processing determines that one or more environment temperature measurements reaches or exceeds an environment temperature limit or reaches or exceeds a rate of environment temperature change limit.

13. The thermometer of claim 12, further comprising an output coupled to the controller to display the first temperature reading.

14. The thermometer of claim 13, wherein the controller is configured to provide a message associated with the error signal to the output for display.

15. The thermometer of claim 12, wherein the controller is further configured to process a second temperature reading from the temperature sensor when the controller determines that one or more environment temperature measurements does not reach or exceed the environment temperature limit or does not reach or exceed the rate of environment temperature change limit.

16. The thermometer of claim 12, wherein the controller is further configured to execute a calibration timer having a limit value and the calibration timer is configured to operate after the timer is executed.

17. The thermometer of claim 16, wherein the controller is configured to determine if the limit value for the calibration timer is reached or exceeded when the controller determines that one or more environment temperature measurements reaches or exceeds an environment temperature limit or reaches or exceeds a rate of environment temperature change limit.

18. The thermometer of claim 17, wherein the controller is configure to change a timer value is when the limit value for the calibration timer is not reached or exceeded.

19. The thermometer of claim 17, wherein the controller is configure to power the thermometer off when the limit value for the calibration timer is reached or exceeded.

20. The thermometer of claim 16, wherein the controller is configure to power the thermometer off when the limit value for the timer is reached or exceeded.

* * * * *